March 31, 1931.  H. A. DE VRY  1,798,144
MOTION PICTURE PROJECTOR
Filed April 4, 1924    2 Sheets-Sheet 2
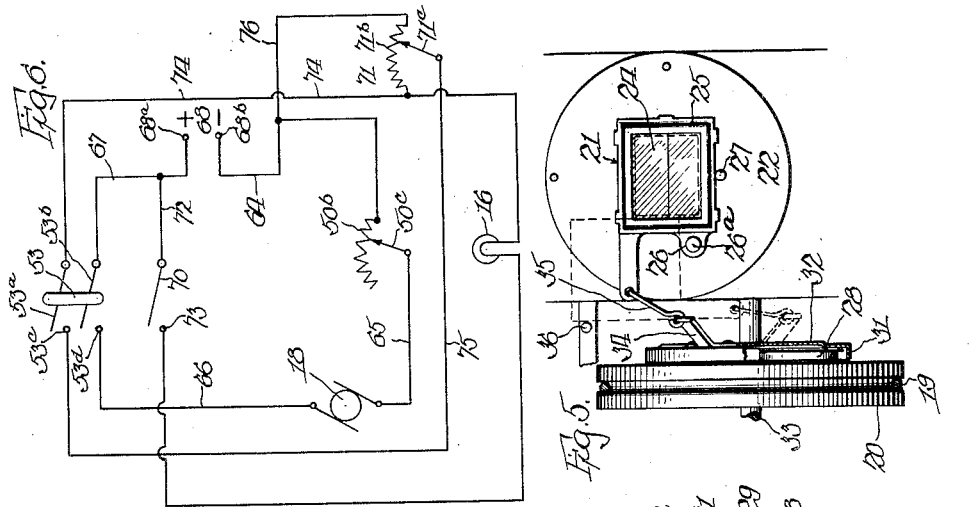
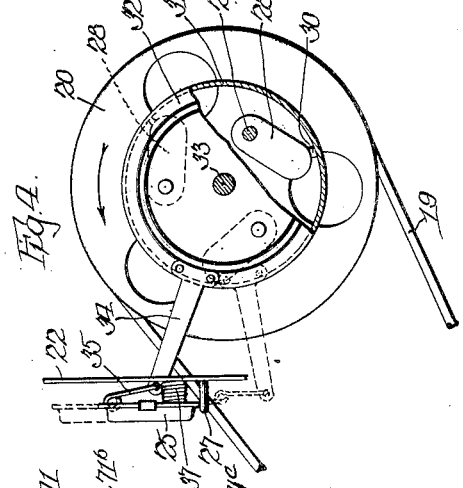
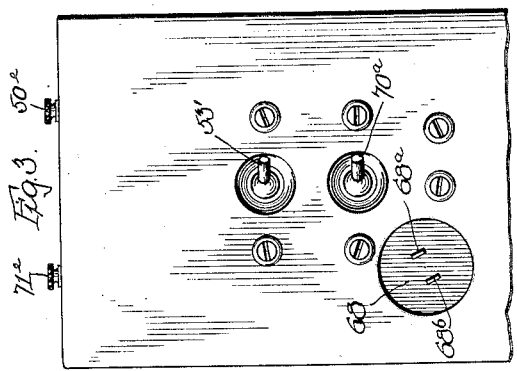
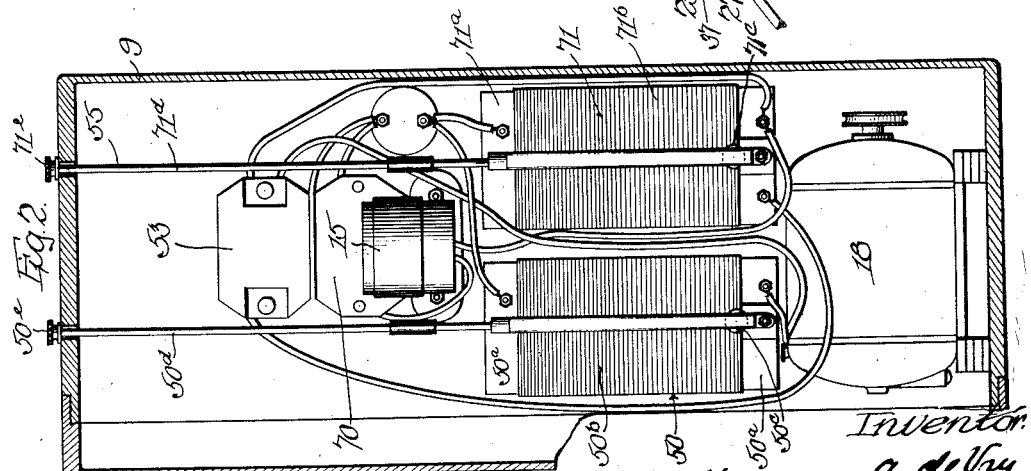

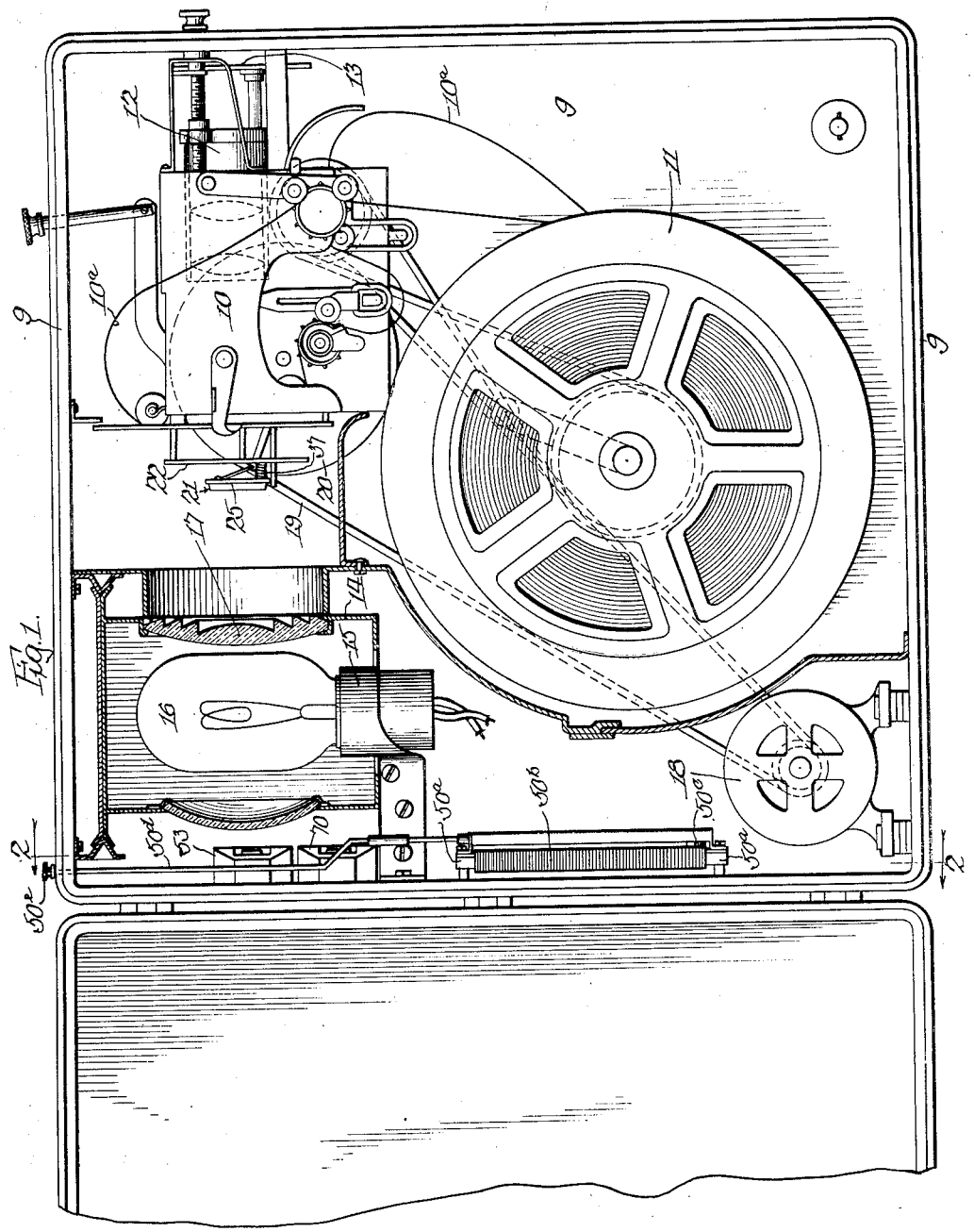

Patented Mar. 31, 1931

1,798,144

UNITED STATES PATENT OFFICE

HERMAN A. DE VRY, OF CHICAGO, ILLINOIS, ASSIGNOR, BY MESNE ASSIGNMENTS, TO Q. R. S.-DE VRY CORPORATION, OF CHICAGO, ILLINOIS, A CORPORATION OF ILLINOIS

MOTION-PICTURE PROJECTOR

Application filed April 4, 1924. Serial No. 704,108.

The invention relates to motion picture projectors.

In the operation of projectors, it is sometimes necessary or desirable to stop the mechanism for feeding the film step-by-step across the exposure opening while the lamp is active, for the purpose of projecting a stationary picture on the screen. When that occurs, the heat radiating from the lamp is likely to become excessive and overheat or endanger the inflammable film. To meet this condition, it has been common practice to interpose a transparent heat reflecting shield between the lamp and the film while the lamp is active and the film stationary. One objection to the employment of an element, which selectively reflects the infra-red rays and transmits a percentage of the visible radiation, is that adjustment of the projecting lens is usually necessary to rectify change in the conditions resulting from the reflection when the shield is operated.

One object of the present invention is to provide an improved projector in which the necessity of adjusting the projecting lens, when the machine is changed from motion to stationary projection or vice versa, is dispensed with. This object is attained by automatically reducing the voltage or luminosity of the lamp when the motor and film are stopped, so that a light transmitting and substantially non-reflecting or heat absorbing shield will be sufficient to avoid overheating the film while it is stationary.

Another object of the invention is to provide an improved projector, in which a transparent heat-absorbing fire shutter between the lamp and the film will suffice to prevent overheating the film while it is stationary. Other objects will appear from the detailed description.

The invention consists in the several novel features hereinafter set forth and more particularly defined by claims at the conclusion hereof.

In the drawings: Fig. 1 is a side elevation of a portable motion picture projector of the self-contained type and embodying the invention, the cover of the case being open. Fig. 2 is a section on line 2—2 of Fig. 1, the cover being closed. Fig. 3 is a detail showing the switches for controlling the lamp and motor circuits respectively. Fig. 4 is a detail of the automatic governor for controlling the fire shutter or gate. Fig. 5 is a front elevation of the fire-shutter. Fig. 6 is a diagram of the electric circuits for the motor and lamp.

The invention is exemplified in connection with a machine of the general type set forth in Letters Patent No. 1,303,543 dated May 13, 1919, and Letters Patent No. 1,546,369, dated July 21, 1925. The film-feeding mechanism 10 and coaxial supply and take-up spools 11, film-guiding means, projecting lens 12, shutter 13, combined enclosing and carrying case 9, are substantially the same in arrangement and construction as set forth in said Patent No. 1,303,543 and the construction of the lamp-house 14 and the holder 15 for the lamp 16 and the condenser lens 17 correspond substantially to that set forth in the aforesaid Letters Patent No. 1,546,369, to which reference may be had for the detail construction and operation thereof.

An electric motor 18 is mounted in the lower left-hand corner of the case to drive an endless belt 19 which drives a pulley 20 through which all of the film-feeding mechanism and the shutter are driven. A fire-shutter 21 is pivotally supported on the frame 22 which is hinged to swing laterally to provide access to the slideway for the frame. This shutter consists of a heat absorbing element 24, such as green-glass, and a frame 25 in which the element is mounted. The shutter is pivoted at 26 to a stud 26ª which is mounted on frame 22. A spring 37 is disposed around said stud and holds the shutter normally in operative position (as shown in Fig. 5). This shutter remains closed at all times, except when the motor is running and the film-feeding mechanism is operating to feed the film 10ª step-by-step across the exposure opening for motion picture projection. When the motor is running, the fire shutter will be automatically held open by a governor consisting of weighted arms 28 which have their inner ends pivoted at 29 to the motor driven pulley 20 and are provided with friction surfaces 30 adapted, under the action of centrifugal force of the arms, to engage the inner periphery 31 of a drum 32 which is loosely mounted on the shaft 33 for the pulley 20. An arm 34 is fixed to swing with the drum to operate a link 35 and swing the fire shutter into its inoperative position as long as the friction surfaces 30 exert sufficient friction against the drum to overcome the tension of spring 37 and the weight of the shutter. A stop 36 is provided to limit the rotation of arm 34 and drum 32. This exemplifies an automatically controlled fire shutter which is retained in its operative position when the motor is not running and which is held open while the motor is running.

Motor 18 is operated by current which flows through a circuit in which is included a rheostat 50 for controlling the speed of the motor. This rheostat comprises a suitable insulating core $50^a$, a resistance winding $50^b$, a contact $50^c$, adapted to slide over said windings to control the length of the resistance in the motor circuit, and a rod $50^d$ connected to said contact and extending upwardly through the top of the case and there provided with a button $50^e$ for manipulating the contact. The operation of the motor is controlled by a two-pole switch 53 which is mounted on the back of the case and has its shifting handle 53' conveniently accessible from the outside of the case. Said switch comprises members $53^a$ and $53^b$ adapted respectively to engage contacts $53^c$ and $53^d$. Switch-member $53^d$ is adapted to control the flow of current through the motor. The circuit for the operation of the motor includes a switch-socket 68 comprising members $68^a$ and $68^b$ adapted, by means of an ordinary switch-plug, to be connected to the conductors of a supply circuit; a conductor 67 between members $68^a$ and switch-member $53^b$ of the two-pole switch 53; a conductor 66 between contact $53^d$ and one of the motor terminals; a conductor 65 between the other motor terminal and rheostat contact $50^c$; a coil $50^b$ of the rheostat; and a conductor 64 between said coil and the member $68^b$ of switch socket 68. By adjusting the contact $50^c$ by means of button $50^e$ outside of the carrying case, the speed of the motor may be regulated as desired.

The operation of the lamp 16 is controlled by a single pole switch 70 which is mounted inside and on the back of the case and has a button $70^a$ conveniently accessible from the outside of the case. A rheostat 71, for varying the flow of current through the lamp circuit, comprises an insulating core $71^a$, a resistance coil $71^b$ around said core; a contact $71^c$ slidable longitudinally of the coil and secured to a rod $71^d$ which extends through the top of the case and is there provided with a button $71^e$ for shifting the contact $71^c$. While the motor is running and the switch 53 is closed, the circuit for the operation of the lamp will be as follows: socket switch-member $68^b$, conductors 64, 76, a portion of the resistance coil $71^b$, rheostat contact $71^c$, conductor 75, contact $53^c$, switch-member $53^a$ of switch 53, conductor 74 in which the lamp is included, contact 73, switch-member 70, conductors 72, 67, and switch socket member $68^a$. When the lamp is to be actuated while the motor is not running and the film is stationary, the circuit for the operation of the lamp will be as follows: member $68^b$, conductor 76, rheostat coil $71^b$, conductor 74 in which the lamp is included, contact 73, switch-member 70, conductors 72, 67 and member $68^a$. The opening of the motor switch automatically causes the entire resistance coil $71^b$ to be automatically shunted into the lamp circuit, so that the voltage will be reduced correspondingly to the maximum resistance of the rheostat 71 and the contact $71^c$ will be rendered inoperative to cut out any operation thereof.

The operation of the projector will be as follows: While the two-pole switch 53 is closed and the motor is running to operate the film-feeding mechanism to advance the film step-by-step across the projection-opening, the fire-shutter or shield 21 will be raised into its inoperative position and the speed of the motor may be regulated by the adjustment of contact $50^c$ to cut more or less of the resistance coil $50^b$ into the motor circuit. While the motor-circuit is closed and the motor is running and the film is being advanced, the lamp-circuit will be through the resistance coil $71^b$ and contact $71^c$ so that the luminosity of the lamp may be regulated as desired by the rheostat 71. At such time, there is no danger of over heating the film, because of its rapid movement. When, however, the motor is not running and the film is stationary, the lamp circuit will include the entire resistance coil $71^b$ which will be shunted into said circuit and the voltage passing through the lamp 16 will be reduced correspondingly to the maximum resistance of rheostat 71 so that the luminosity of the lamp will be lessened to correspondingly reduce the heat and render the machine safely operable with the film stationary. As a result of automatically reducing the voltage of the lamp-circuit and the luminosity of the lamp while the film is stationary, it becomes possible to use a fire shutter of glass which will absorb the heat radiations to reduce the intensity of the heat passing to the film as contradistinguished from reflection, as is done when gold-glass is used.

The invention exemplifies a motion picture projector in which provision is made for automatically causing the luminosity of the lamp and the heat radiations to be reduced when the film is stationary; in which the heat from the lamp is automatically reduced by manipulation of the motor-switch; in which provision is made for varying the operation of the motor and the voltage of the current through the lamp as desired, according to practical needs and in which the maximum resistance of the lamp rheostat is automatically shunted into the lamp circuit when the motor is stopped; which is particularly advantageous in projectors of the self-contained type or those in which the film and lamp-house are contained in a small enclosing case; in which excessive heat constitutes an element of danger; and in which an inexpensive heat-absorbing element, such as green glass, may be used in the fire-shutter, as contra-distinguished from gold glass.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motion picture projector, the combination of mechanism for feeding film, a motor for driving said mechanism, a switch for controlling the motor, an electric lamp, a circuit for the lamp, a rheostat for varying the luminosity of the lamp during operation of the motor comprising a resistance element connected to the lamp circuit and a manually operable contact, and means for including a predetermined amount of said resistance element in the lamp circuit when the motor switch is opened, regardless of the position of said contact, to reduce the luminosity of the lamp when the motor is not in operation.

2. In a motion picture projector, the combination of mechanism for feeding film, a motor for driving said mechanism, a switch for controlling the motor, an electric lamp, a circuit for the lamp, a rheostat for varying the luminosity of the lamp during operation of the motor comprising a resistance element connected to the lamp circuit and a manually operable contact, and means for including the entire resistance element in the lamp circuit when the motor switch is opened, regardless of the position of said contact, to reduce the luminosity of the lamp when the motor is not in operation.

3. In a motion picture projector, the combination of mechanism for feeding film, a motor for driving said mechanism, a switch for controlling the motor, an electric lamp, a rheostat comprising a resistance element and a contact movable over said element to include more or less thereof, a circuit for the lamp comprising a pair of line-conductors connected to a source of electric current, a conductor between one of the line-conductors and one end of the resistance element, a second conductor between the contact and the other end of said element, and a third conductor between said other end of the resistance element and the other line-conductor, a switch connected to the second conductor, and means for automatically opening said last mentioned switch, when the motor switch is opened so as to break the second conductor, and thereby establish a second circuit for the lamp which consists of the first conductor, the entire resistance element, and the third conductor.

4. In a motion picture projector, the combination of mechanism for feeding film, a motor for driving said mechanism, a switch for controlling the motor, an electric lamp, a rheostat consisting of a resistance element and a contact movable over said element to include more or less thereof, a circuit for the lamp comprising a pair of line-conductors connected to a source of electric current, a conductor between one of the line-conductors and one end of the resistance element, a second conductor between the contact and the other end of said element, and a third conductor between said other end of the resistance element and the other line-conductor, a switch connected to the second conductor, means for automatically opening said last mentioned switch, when the motor switch is opened so as to break the second conductor, and thereby establish a second circuit for the lamp which consists of the first conductor, the entire resistance element, and the third conductor, and a switch connected to the third conductor for controlling the second lamp circuit.

5. In a motion picture projector, the combination of mechanism for feeding film, a projecting lamp, a transparent shield between the lamp and the film, a motor for driving said mechanism, speed controlled means operated by the motor for operating the shield into and out of its operative position, a switch for controlling the motor, a circuit for the electric lamp, a rheostat comprising a resistance element connected to the lamp circuit and a manually adjustable contact, and means whereby a predetermined amount of the resistance element will be included in the lamp circuit when the motor switch is opened, independently of the position of the contact.

Signed at Chicago, Illinois, this 26th day of March, 1924.

HERMAN A. DE VRY.